US012230903B2

(12) United States Patent
Busch et al.

(10) Patent No.: US 12,230,903 B2
(45) Date of Patent: Feb. 18, 2025

(54) CONNECTING ELEMENT FOR MOUNTING AN ELECTRICAL CIRCUIT BOARD TO A FLAT ELECTRICAL CONDUCTOR

(71) Applicant: Weidmüller Interface GmbH & Co. KG, Detmold (DE)

(72) Inventors: Gerald Busch, Lage (DE); Peter Stuckmann, Lage (DE); Ralf Schumacher, Lemgo (DE); Kurt Hermanns, Groß-Umstadt (DE); Thomas Wielsch, Detmold (DE)

(73) Assignee: Weidmüller Interface GmbH & Co. KG (DE)

( * ) Notice: Subject to any disclaimer, the term of this patent is extended or adjusted under 35 U.S.C. 154(b) by 223 days.

(21) Appl. No.: 17/740,495

(22) Filed: May 10, 2022

(65) Prior Publication Data

US 2022/0368049 A1 Nov. 17, 2022

(30) Foreign Application Priority Data

May 11, 2021 (DE) ......................... 102021112259.7

(51) Int. Cl.
*H01R 12/72* (2011.01)
*H01R 4/48* (2006.01)
(Continued)

(52) U.S. Cl.
CPC ............. *H01R 12/728* (2013.01); *H01R 4/48* (2013.01); *H01R 9/2458* (2013.01); *H01R 9/2675* (2013.01)

(58) Field of Classification Search
CPC ...... H01R 12/278; H01R 4/48; H01R 9/2458; H01R 9/2675; H01R 13/113;
(Continued)

(56) References Cited

U.S. PATENT DOCUMENTS 3,827,005 A * 7/1974 Friend .................. H01R 12/728 439/858

FOREIGN PATENT DOCUMENTS

DE 2422538 A1 11/1974
DE 10216159 A1 * 7/2003 ........... H01R 9/2466
(Continued)

OTHER PUBLICATIONS

Machine Translation DE 102014001272 A1, Aug. 20, 2015, (Year: 2024).*
(Continued)

*Primary Examiner* — Travis S Chambers
(74) *Attorney, Agent, or Firm* — LAUBSCHER & FRETWELL, P.C.

(57) ABSTRACT

A connecting element for mounting an electrical circuit board to an electrical flat conductor, in particular a busbar, has a flat or substantially flat mounting surface for applying and mounting the connecting element to the circuit board, and a tulip contact for receiving the flat conductor in an electrically contacting manner. The tulip contact includes at least one clamping element and a support element, between which a receptacle for the flat conductor is provided, and wherein the tulip contact preferably extends at a mounting angle greater than 45° and less than 135° with respect to the mounting surface. An electrical circuit board having such a contact element, a terminal block having such an electrical circuit board, and a method for automated mounting of such a terminal block are also provided.

11 Claims, 8 Drawing Sheets

(51) Int. Cl.
*H01R 9/24* (2006.01)
*H01R 9/26* (2006.01)

(58) Field of Classification Search
CPC .... H01R 9/2466; H01R 9/2625; H01R 12/57; H01R 12/51; H05K 1/11; H05K 5/0217
See application file for complete search history.

(56) References Cited

FOREIGN PATENT DOCUMENTS

| | | | | | |
|---|---|---|---|---|---|
| DE | 202013105726 | U1 | | 3/2015 | |
| DE | 102014001272 | A1 | * | 8/2015 | ........... H01R 13/112 |
| DE | 102019125285 | A1 | | 3/2021 | |
| DE | 102020104620 | B3 | | 3/2021 | |
| EP | 1326304 | A2 | | 7/2003 | |
| EP | 1291976 | B1 | * | 1/2011 | ............... H01R 4/24 |
| KR | 20170110287 | A | | 10/2017 | |
| WO | 2021053662 | A1 | | 3/2021 | |

OTHER PUBLICATIONS

Machine Translation WO 2021053062, Mar. 25, 2021, (Year: 2024).*
Machine Translation DE-10216159-A1, Jul. 3, 2003, (Year: 2024).*

* cited by examiner

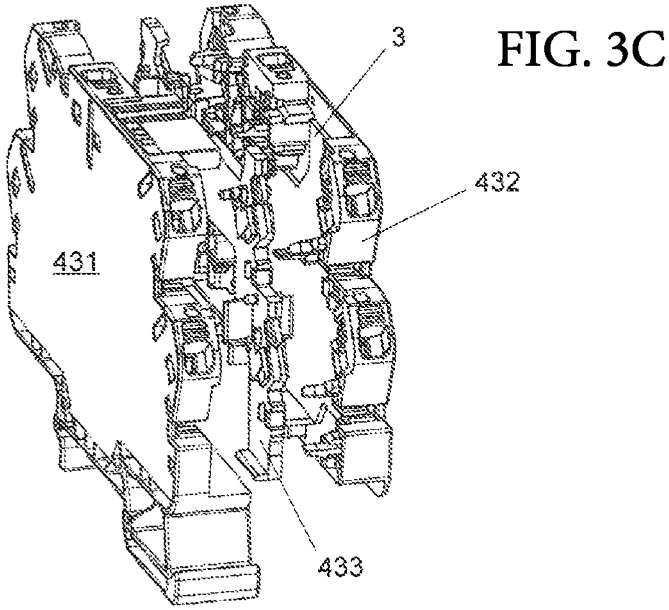
FIG. 3C
FIG. 3D
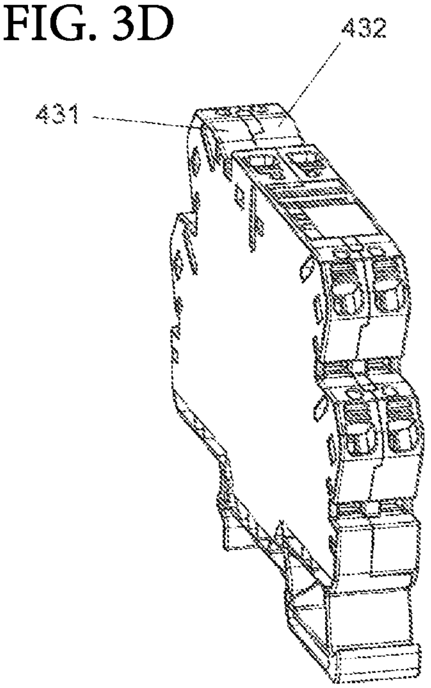

CONNECTING ELEMENT FOR MOUNTING AN ELECTRICAL CIRCUIT BOARD TO A FLAT ELECTRICAL CONDUCTOR

This application claims priority of DE 10 2021112259.7 filed May 11, 2021, the entire contents of which are incorporated herein by reference.

BACKGROUND OF THE INVENTION

The present invention relates to a connecting element for mounting an electrical circuit board to an electrical conductor, in particular a busbar, having a flat or substantially flat mounting surface for applying and mounting the connecting element to the circuit board, and having a tulip contact for receiving the flat conductor in an electrically contacting manner. The present invention also relates to an electrical circuit board having such a connecting element, a terminal block having such an electrical circuit board, and a method for automated mounting of such a terminal block.

Terminal blocks are used for quick, easy and safe connection of electrical conductors, especially in control cabinet construction. For adaptation to different requirements and tasks (e.g. feed-through terminal block, fuse terminal block, protective conductor terminal block, terminal block with electronic components, etc.), in addition to connection devices for connecting electrical conductors (e.g. in direct plug-in technology, as a screw connection or in tension clamp technology), they regularly include a circuit board which can be equipped according to the requirements, in particular individually according to customer specifications.

BRIEF DESCRIPTION OF THE PRIOR ART

The publication EP 1 326 304 A2 discloses a terminal block in which the mounting of the circuit board into the terminal block is simplified.

SUMMARY OF THE INVENTION

The object of the present invention is to provide an alternative terminal block that automates and further simplifies the mounting of the circuit board.

For this purpose, a connecting element is created for mounting an electrical circuit board to an electrical flat conductor, in particular a busbar. The connecting element has a flat mounting surface which is designed to be placed against the circuit board and is provided for mounting the connecting element on the circuit board. Furthermore, the connecting element has a tulip contact for receiving the flat conductor in an electrically conductive contacting manner.

The connecting element is characterized in that the tulip contact includes at least one clamping element and one support element. A receptacle for the flat conductor is provided between the clamping element and the support element. For the purpose of receiving the flat conductor in an electrically conductive contacting manner, the connecting element, in particular the tulip contact, is preferably pushed onto the flat conductor, in particular in a sliding direction, or the flat conductor is pushed into the tulip contact, in particular against the sliding direction.

According to a preferred embodiment, the connecting element is characterized in that the tulip contact extends at a mounting angle greater than 45° and less than 135° to the mounting surface. This allows the connecting element to be pushed onto the flat conductor at the mounting angle, or the flat conductor to be pushed into the tulip contact at the mounting angle. Preferably, the flat conductor is clamped in the tulip contact.

In order to be able to mount several, in particular mutually rotated, connecting elements in the same mounting angle on flat conductors at the same time, it is preferred that the mounting angle is an approximately right angle. In this embodiment, the tulip contact extends at an approximately right mounting angle to the mounting surface.

The connecting element not only enables an electrically conductive connection of the flat conductor to the circuit board. It also enables the circuit board to be mounted by sliding the tulip contact onto the flat conductor.

It is preferred that a latching device is provided on the clamping element for latching the connecting element to the flat conductor. This ensures that the circuit board is securely mounted on the flat conductor even under vibration loads. In this embodiment, the flat conductor preferably has a mating latching device that interacts with the latching device on the clamping element. As a result, the connecting element and the flat conductor can be clamped and/or latched together.

The support element preferably extends from the mounting surface towards a free end. It is arranged at one support end of the mounting surface. In the mounted state, it serves at least in sections as a contact surface and as a first tulip contact element for contacting the flat conductor.

According to a further preferred embodiment, the clamping element extends towards a free end facing away from the mounting surface, i.e. quasi in the opposite direction to the support element or first tulip contact element. The two tulip contact elements are thus preferably directed in opposite directions, which results in particularly advantageously realizable designs that make contacting a circuit board simple and safe.

At a connecting end of the mounting surface facing away from the support element, the connecting element also preferably has a connecting arm. The clamping element is arranged on the connecting arm, in particular on a contact end of the connecting arm. In this case, two clamping elements can be arranged next to each other, on the connecting arm. The mounting surface is therefore connected to the clamping element by the connecting arm. It is preferred that the connecting arm engages over the support element and is spaced from the free end of the support element. The clamping element is thereby arranged in a resiliently yielding manner on the connecting arm. It is pivotable relative to the connecting arm against a restoring force. As a result, the clamping element extends in the sliding direction and the support element extends against the sliding direction.

To enable the flat conductor to be clamped and/or latched in the tulip contact, it is preferred that the contact element and the support element are aligned essentially parallel to one another. In this case, both the support element and the clamping element can at least partially have an arcuate, angular and/or curved contour in cross-section. It is essential that the flat conductor can be inserted into the tulip contact, i.e. between the support element and the clamping element in the mounting angle, and can be clamped and/or latched there.

The clamping element preferably has an arcuate connection to the connecting arm for this purpose. It is also preferred that the cross-section of the connecting arm is curved or angled.

In a preferred embodiment, the connecting arm has a contour that is substantially rectangular in cross-section. In this embodiment, an outer surface of the connecting device is arranged approximately parallel to the mounting surface and spaced therefrom. In a state mounted on the circuit board, this outer surface is therefore particularly accessible. It is preferred that a fastening device for an automation robot is provided on this outer surface of the connecting arm, or that at least a part of the outer surface (141) forms the fastening device. In a particularly preferable manner, this is a suction surface. The suction surface enables the connecting element to be gripped in the mounted state in which it is attached to the circuit board. This allows the circuit board to be mounted with the automation robot.

For mounting the connecting element to the electrical circuit board, a mounting device is also preferably provided on the connecting element. In a preferred embodiment, this can be a through-hole that passes through the mounting surface. The connecting element can then be fastened to the circuit board by soldering and/or screws or rivets, for example. Preferably, it is fastened in an automatic machine for soldering (reflow); optionally or alternatively by other fastening such as rivets or screws or the like. Preferably, in the mounted state, it is electrically conductively connected to a conductor track or conductive surface of the circuit board.

It is particularly preferred in this case that the connecting element is manufactured in one piece, especially from an electrically conductive flat strip material. In a particularly preferred embodiment, it can be produced very quickly and inexpensively as a stamped and bent component. An electrically conductive metal or an electrically conductive metal alloy is preferably used for this purpose. In the mounted state, the connecting element is preferably provided for the electrically conductive connection of the flat conductor to the conductor track or conductive surface of the circuit board.

The object is further solved with an electrical circuit board having such a connecting element. It is preferred that the mounting surface of the connecting element lies flat against the circuit board. Preferably, it lies flat against a conductor track or a conductive surface of the circuit board and makes electrically conductive contact therewith.

The mounting surface and/or the support element are preferably arranged flush with an edge of the circuit board. As a result, the contact element extends next to the circuit board. As a result, the circuit board is arranged next to the flat conductor when the connecting element, in particular the tulip contact, is pushed onto it.

The object is further solved with a terminal block of a modular design having an insulating housing, in particular a modular housing, in which a connecting device for connecting an electrical conductor is arranged, having a flat conductor, for example a busbar, and having such an electrical circuit board, in particular a first electrical circuit board. Preferably, the terminal block has at least two or more connection devices, so that several electrical conductors can be connected to the terminal block. Furthermore, it is preferred that the connection devices each include a busbar. Preferably, at least two or more of the busbars can be pushed onto a connecting element attached to the circuit board. As a result, the electrical conductors inserted into the connection devices can be connected to the circuit board in an electrically conductive manner.

The circuit board, in particular the connecting element attached to the circuit board, enables fully automatic mounting of the terminal block. In this process, the insulating material housing, or at least one housing shell of the insulating material housing, with the connection devices for the electrical conductors as well as with the flat contact, in particular the busbar, and/or further mechanical components can be prefabricated. The mounting of the circuit board with any electronics arranged on the circuit board can take place late in the mounting process. This simplifies the handling of circuit boards of different, in particular individual, embodiments. In addition, testing of the circuit board, in particular of the electronics with which the circuit board is equipped, as well as its repair can take place late in the mounting process. Furthermore, the connection devices can still be cross-connected after the circuit board has been assembled. This is preferably an internal cross-connection—i.e. within the housing. This takes place in housings made of several slices. The cross-connection is then made when the individual slices are joined together, if necessary via an additional element.

For clamping and/or latching with the connecting element, the latter has a latching device which is preferably arranged on the contact tulip, in particular on the clamping element. The flat conductor preferably has a mating latching device for this purpose, which interacts with the latching device in the mounted state.

Furthermore, a recess for receiving the electrical circuit board is preferably provided in the insulating material housing, in particular in a housing shell of the insulating material housing. Preferably, this recess has a shape adapted to the contour of the circuit board.

In order to prevent a relative movement caused when mounting the connecting element to the flat conductor, it is further preferred that the insulating material housing has a stop, in particular a pin, and the circuit board has a mating stop, in particular a through hole, which interact. In a preferred embodiment, the stop is designed as a pin, with the mating stop being designed as a through-hole, or vice versa. In this case, the contours and/or dimensions of the through-hole and the pin are matched to one another in such a way that the pin fits precisely into the through-hole and prevents relative movement.

In a further preferred embodiment, the terminal block has two or more shells. In this case, it preferably has a first housing shell with a recess for receiving the, in particular, first circuit board, and a second housing shell with a recess for receiving a second circuit board. This embodiment allows the arrangement of considerably more connection devices and/or considerably more complex electronics of the terminal block. In order to electrically insulate the electrical components of the terminal block, in particular the connection devices and/or the flat conductors, from each other, it is preferred that an insulating wall is arranged between the housing shells.

Furthermore, electrical connecting devices and correspondingly designed mating connecting devices, which interact in an electrically conductive manner, can be fastened to the housing shells and are provided for connecting conductor tracks and/or conductor surfaces of the first and second circuit boards. In order to enable simple and fast connection of the interacting connecting devices of the two housing shells by plugging on, breakout areas can be provided in the insulating wall in a targeted manner, so that plugging on is possible after the breakout area has been broken out through the passage area created in the process. The breakout areas can also be used to fit the circuit boards with components that are thicker than the housing shells. After breaking out the breakout area, these components can protrude through the resulting through area into the opposite housing shell.

The object is further solved with a series connection arrangement having at least two such terminal blocks arranged next to each other, in particular along a latching rail. Such a series connection arrangement is preferably used in control cabinet construction and/or in production engineering.

The object is further solved with a method for the automated mounting of such a terminal block, in which first a flat conductor is mounted in an insulating material housing, in particular in a housing shell of the insulating material housing, of the terminal block, and in which then an electrical circuit board having a connecting element is mounted by sliding onto the flat conductor in a recess of the insulating material housing. In this case, the connecting element is preferably clamped and/or latched to the flat conductor when the electrical circuit board is mounted, and also makes electrically conductive contact with the flat conductor in the mounted state.

This mounting of the electrical circuit board is possible late in the mounting process of the terminal block. In particular, all mechanical components of the terminal block can be pre-assembled before the circuit board is mounted. The mounting of the terminal block can also be fully automatic.

BRIEF DESCRIPTION OF THE FIGURES

Other objects and advantages of the invention will become apparent from a study of the following description when viewed in the light of the accompanying drawing, in which:

FIG. 3C is an exploded view of the housing shells of FIGS. 3A and 3B with an insulating wall therebetween;

FIG. 3D is a perspective view of the mounted double-shell terminal block;

DETAILED DESCRIPTION

Figure 1:
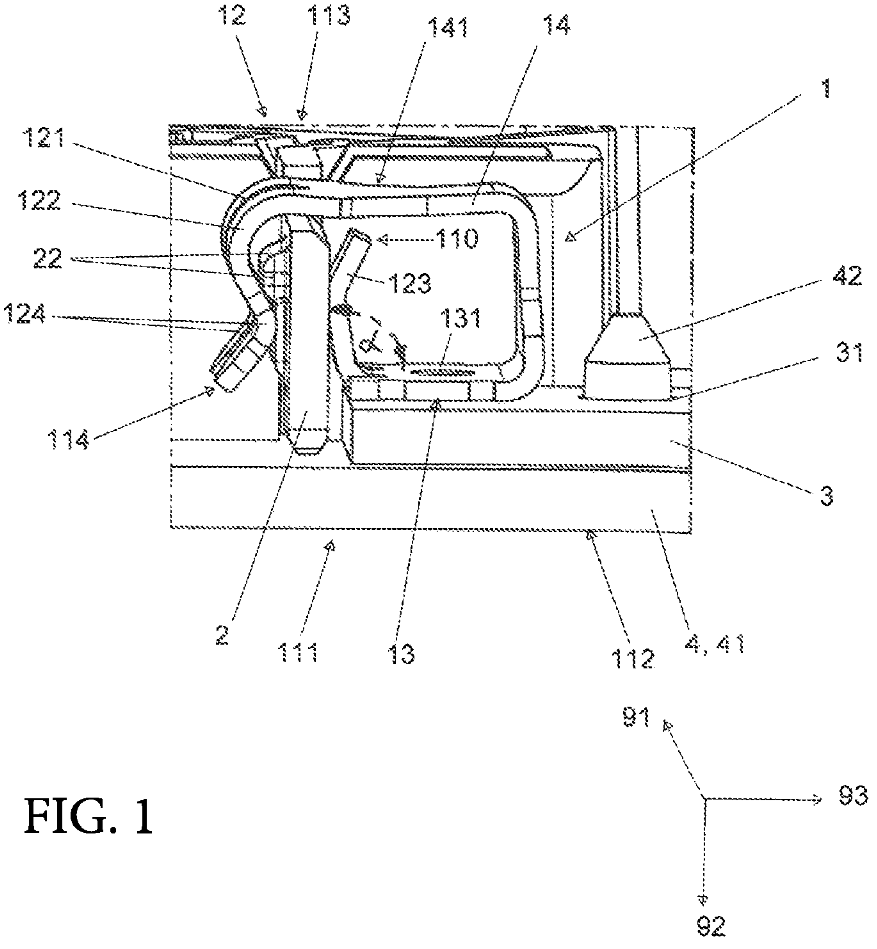
FIG. 1 is a perspective view of a section of a terminal block with a circuit board to which a connecting element is attached.

FIG. 1 shows a section of a terminal block 4, having a circuit board to which a connecting element 1 is attached, which is provided for mounting the electrical circuit board 3 to a flat electrical conductor 2. The connecting element 1 is manufactured in one piece as a stamped and bent component. It is made of a material with good electrical conductivity. The flat conductor 2 can be, for example, a busbar also made of a material with good conductivity. In the following, the terms flat conductor 2 and busbar are therefore used synonymously.

For mounting the connecting element 1 on the electrical circuit board 3, the connecting element 1 has a flat mounting surface 13. The mounting surface 13 is provided for flat contact with the circuit board 3. In order to fasten the connecting element 1 to the mounting surface 13, the connecting element 1 has a mounting device 131 in the form of a through-hole. This allows the connecting element 1 to be fastened to the circuit board 3, for example, by soldering and/or, optionally, by riveting or screwing. In addition, the connecting element 1 is soldered onto a conductor track (not shown) of the circuit board 3 so that it is electrically conductively connected to the conductor track of the circuit board 3.

Alternatively, the connecting element could also be used in such a way that the busbar and circuit board are arranged in parallel. In FIG. 1, the circuit board would be vertical, for example, and soldered to the right side of the contact element. The corresponding side of the contact element would then be designed accordingly.

Furthermore, the connecting element 1 has a tulip contact 12, which is designed to receive the flat conductor 2 in an electrically conductive contacting manner. For this purpose, the tulip contact 12 has two clamping elements 121, 122 arranged next to each other and a support element 123. The flat conductor 2 can be inserted between the clamping elements 121, 122 and the support element 123. For this purpose, either the connecting element 1 can be pushed onto the flat conductor 2 in a sliding direction 92, or the flat conductor 2 can be pushed into the tulip contact 12 against the sliding direction 92.

Here, the tulip contact 12 is oriented at a substantially right mounting angle α with respect to the mounting surface 13. The sliding direction 92 therefore extends substantially transversely to the mounting surface 13, which is spanned by a first line (not shown) extending in a first direction of extension 91 transverse to the sliding direction 92, and by a second line (not shown) extending in a second direction of extension 93 transverse to the sliding direction 92 and transverse to the first direction of extension 91. In the mounted state, in which the flat conductor 2 is received in the tulip contact 12, the flat conductor 2 is clamped between the clamping elements 121, 122 and the support element 123.

In order to reliably prevent the connecting element 1 from detaching from the flat conductor 2, in particular also under vibration conditions, the clamping elements 121, 122 have latching devices 124, wherein the flat conductor 2 comprises mating latching devices 22 which cooperate with the latching devices 124. The latching devices 124 are formed in each case by a bend provided in the respective clamping element 121, 122. Elevations or projections are arranged on the flat conductor 2 as mating latching devices 22. In the assembled state, the bends 124 are arranged below the elevations 22 in the sliding direction 92, so that the connecting devices 1 cannot be displaced against the sliding direction 92. As a result, the connecting element 1 and the flat conductor 2 are not only clamped together in the assembled state, but also latched together, and detachment of the connecting element 1 from the flat conductor 2 is reliably prevented.

The support element 123 is arranged at a support end 111 of the mounting surface 13 thereon and extends from the mounting surface 13 to a free end 110. In the embodiment shown, it has a bend (not designated) with which it rests against the flat conductor 2 in the mounted state.

A connecting arm 14 is further arranged at a connecting end 112 of the mounting surface 13 facing away from the support element 123, which connecting arm 14 is provided for connecting the mounting surface 13 to the clamping elements 121, 122. The clamping elements 121, 122 are arranged at a contact end 113 of the connecting arm 14 opposite the connecting end 112. In this case, the connecting arm 14 engages over the support element 123, so that the clamping elements 121, 122 are arranged on a side (not designated) of the support element 123 facing away from the mounting surface. It is connected to the connecting arm 14 in an approximately arcuate manner. As a result, the clamping element is aligned at the mounting angle α with respect to the mounting surface 13 and is arranged in a resiliently yielding manner on the connecting arm 14. It is pivotable relative to the connecting arm 14 against a restoring force. The contact elements 121, 122 each extend to a free clamping end 114 which is bent away from the support element 123. This allows the flat conductor 2 to slide easily into the tulip contact 12 when the connecting element 1 is pushed on.

The connecting arm 14 has a substantially rectangular shape in cross-section. As a result, it has an outer surface 141 arranged approximately parallel to the mounting surface 13, which serves as a fastening device for an automation robot (not shown). This is a suction surface which enables the connecting element 1 to be gripped, so that the automation robot can mount the circuit board 3 with the connecting element 1 fully automatically in a terminal block 4.

The electrical circuit board 3 to which the connecting element 1 is attached is arranged in a recess 40 (see FIG. 2D) of a terminal block 4. A pin 42 is provided on an insulating material housing 41 of the terminal block 4, which serves as a stop for the circuit board 3. For this purpose, the pin 42 passes through a through-hole 31, which is arranged in the circuit board 3 and is provided as a counter stop. The pin 42 prevents relative movement of the circuit board 3 with respect to the insulating material housing 41 caused during mounting of the connecting element 1 on the flat conductor 2 and/or by the restoring force of the clamping elements 121, 122.

Figure 2B:
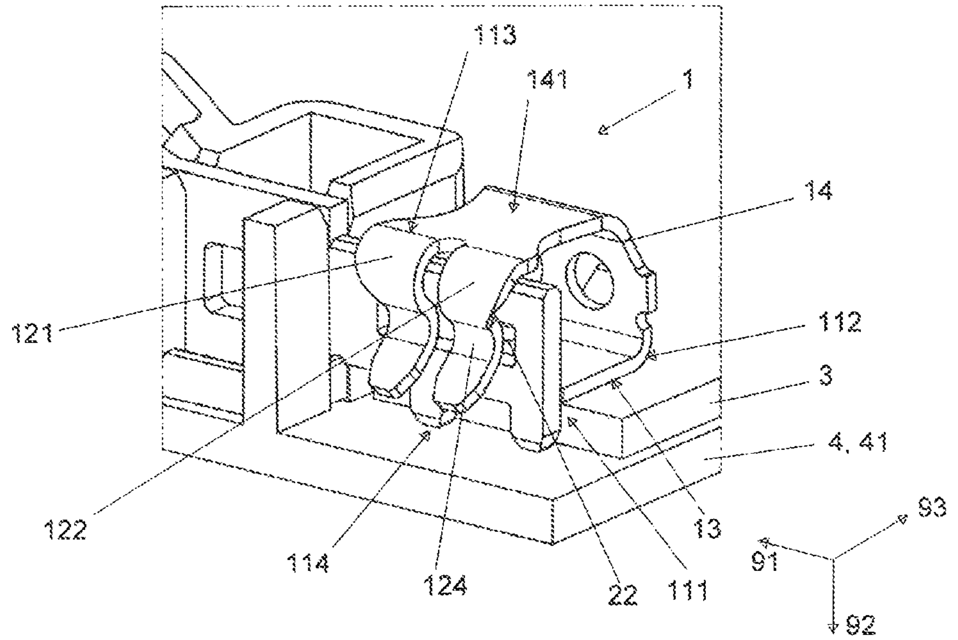
FIGS. 2A, 2B, and 2C are perspective views of different sections, respectively, of a terminal block with a circuit board to which a connecting element of a further embodiment is attached.
Figure 2A:
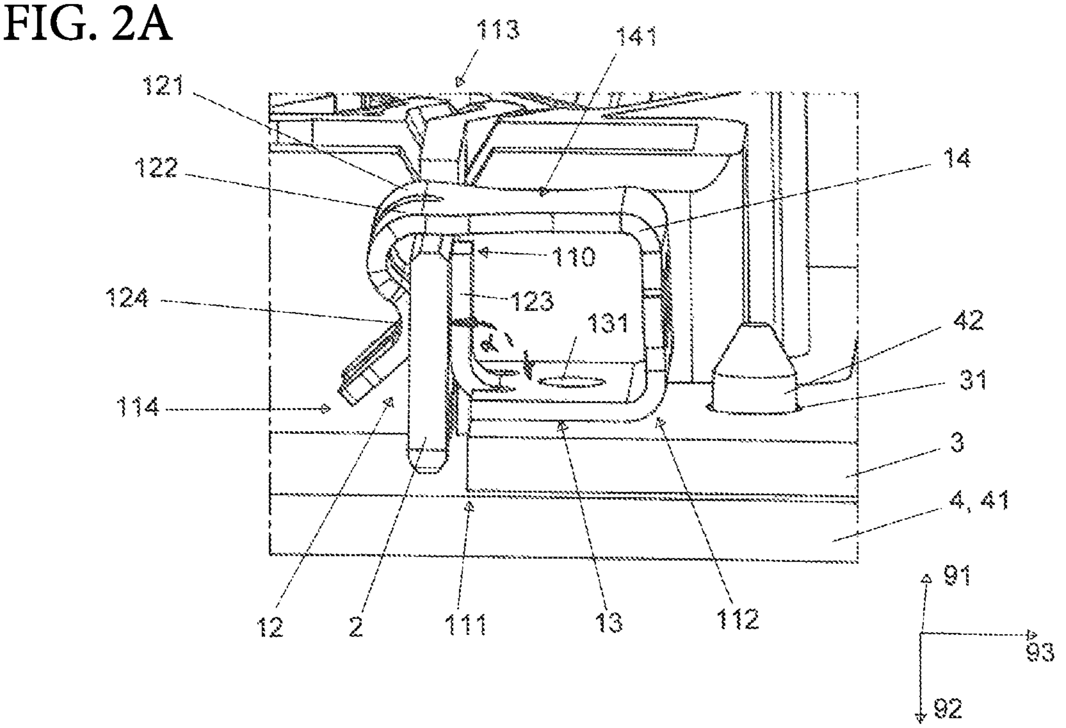
Figure 2F:
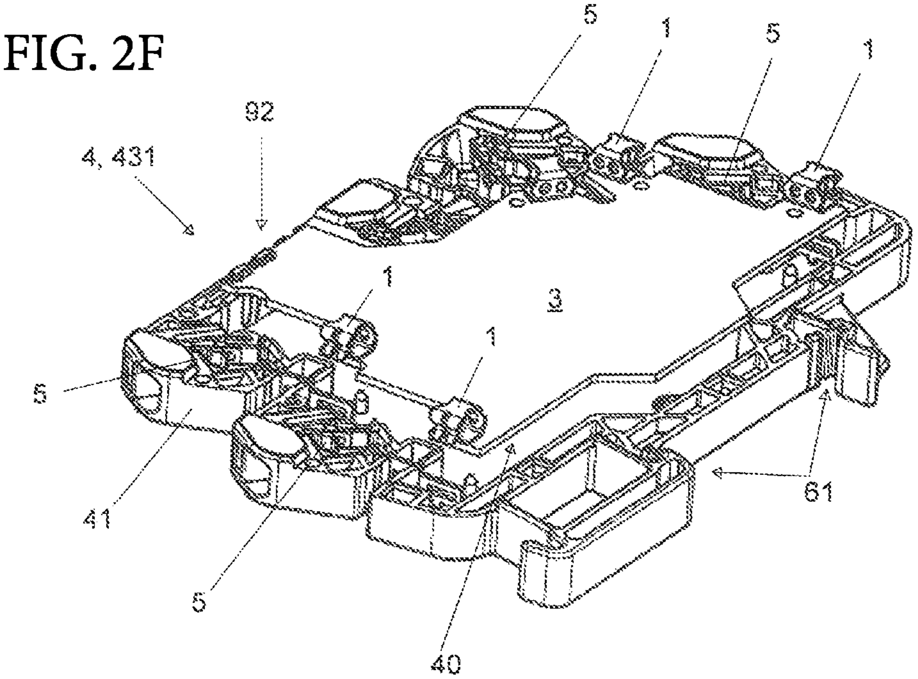
FIG. 2F is a perspective view of the housing shell of FIG. 2D with the circuit board of FIG. 2E mounted thereon.
Figure 2C:
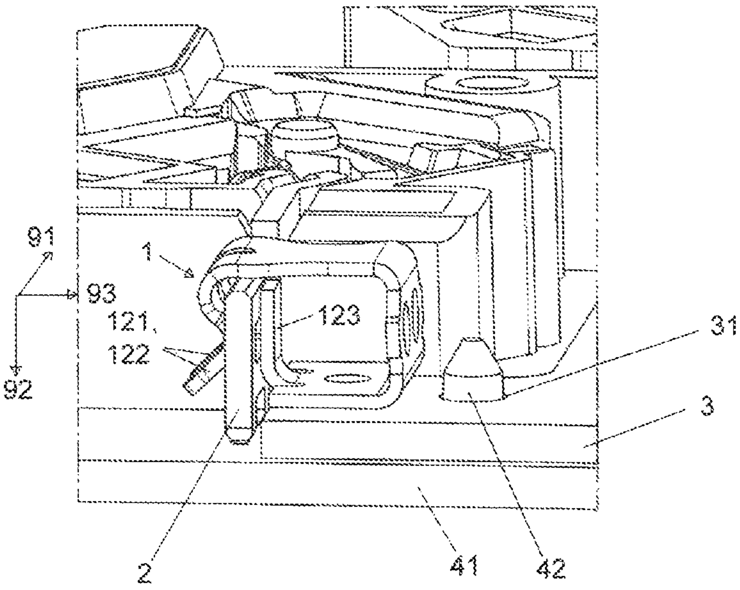
Figure 2D:
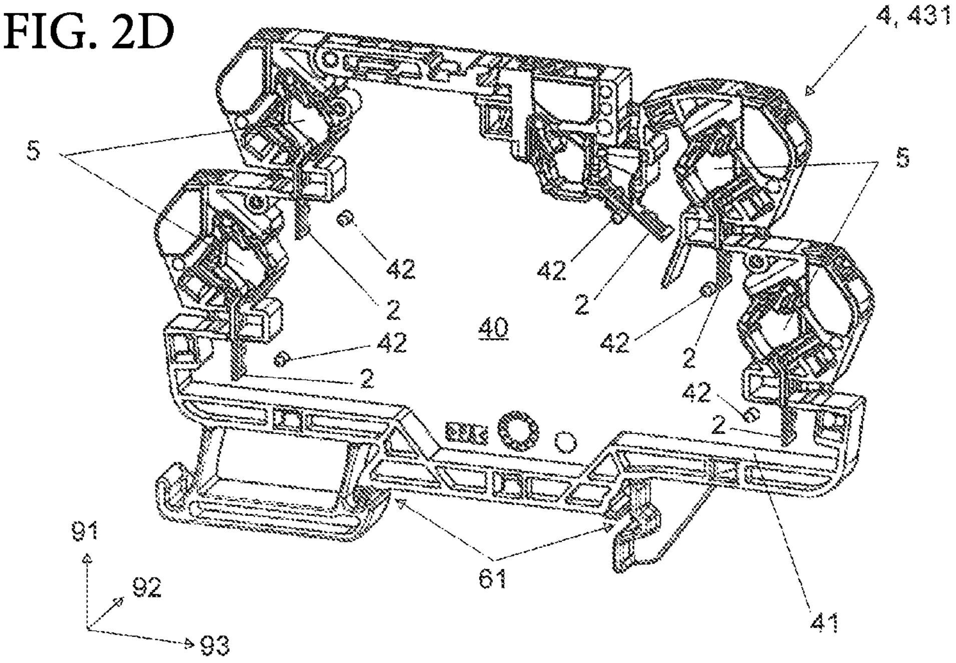
FIG. 2D is a perspective view of a housing shell of a terminal block.
Figure 2E:
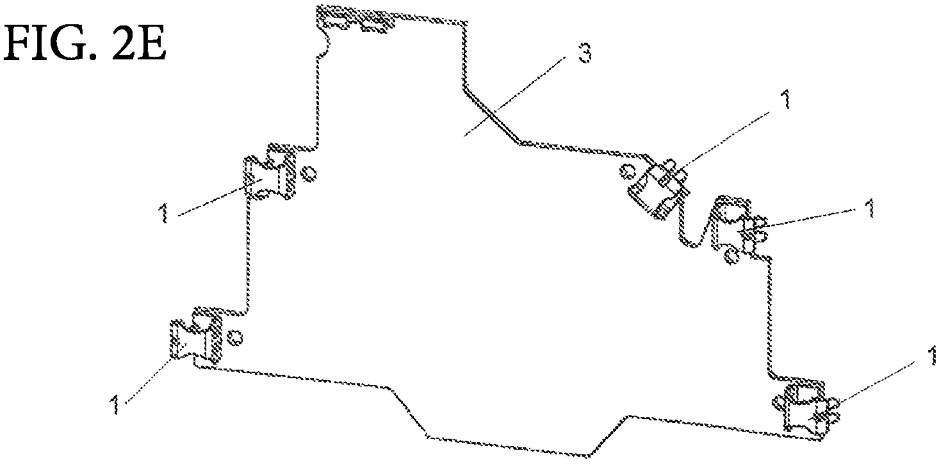
FIG. 2E is a perspective view of a circuit board with a plurality of connection elements.

FIG. 2 shows in A-C in each case a section of the terminal block 4 with the circuit board 3, to which a connecting element 1 of a further embodiment is attached, in a perspective view, in 2D a housing shell 431 of the terminal block 4 in a perspective view, in 2E a circuit board 3 with a plurality of connection devices 1 attached to the circuit board 3 of the embodiment of FIGS. 2A-C in a perspective view, and in (f) the housing shell 431 of FIG. 2D when mounting the circuit board 3 of FIG. 2E.

The connecting element 1 differs from the connecting element 1 of FIG. 1 in the shape of the support element 123, which extends in a straight line at the mounting angle α, in particular at right angles, to the mounting surface 13. Furthermore, the flat conductor 2 arranged in the terminal block 4 differs from the flat conductor 2 of FIG. 1 by the mating latching device 22, which is formed here by an indentation in the form of a groove. In this embodiment, the latching device 124 of the clamping elements 121, 122, which are formed as a bend, latch in the groove. The flat conductor 2 is pressed flat against the support element 123 and thus also clamped.

On the circuit board 3 shown in FIG. 2E there are a number of connecting elements 1 offset and twisted relative to one another in the first and/or second direction of extension 91, 93. Each of the connecting elements 1 is associated with a stop in the form of a pin 42 which, when the circuit board 3 is mounted in the terminal block 4, is guided through the through-hole 31 corresponding thereto, thereby preventing relative movement of the circuit board 3 with respect to the insulating material housing 41 of the terminal block 4.

The terminal block 4 is shown in FIG. 2D. It has a housing 41 formed of insulating material in which a plurality of connecting devices 5 are arranged, each of which is provided for connecting an electrical conductor (not shown) to a busbar 2. A recess 40 is provided in the housing 41 to receive the circuit board 3. The busbars 2 each extend to the recess 40. Furthermore, a pin 42 is arranged in the recess 40 for each connecting element 1, or for each busbar 2, as a stop.

Furthermore, projections 61 are provided on the insulating material housing 41 for snapping the terminal block 4 onto a rail, in particular a hat-shaped rail (not shown).

FIG. 2F shows the mounting of the circuit board 3 in the recess 40 of the housing 41, with the circuit board 3 being pushed into the recess 40 in the sliding direction 92. In the process, the connecting elements 1 are each pushed onto one of the flat conductors 2 at the mounting angle α, so that the flat conductors 2 are each received in the tulip contact 12 of one of the connecting elements 1, and are clamped and/or latched between its support element 123 and its clamping elements 121, 122.

Figure 3B:
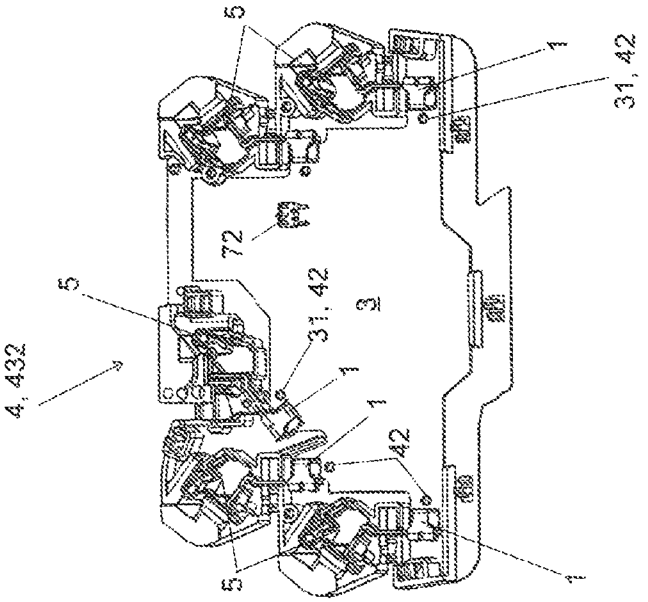
FIG. 3B is a perspective view of a second housing shell of a double-shell terminal block with a mounted circuit board.
Figure 3A:
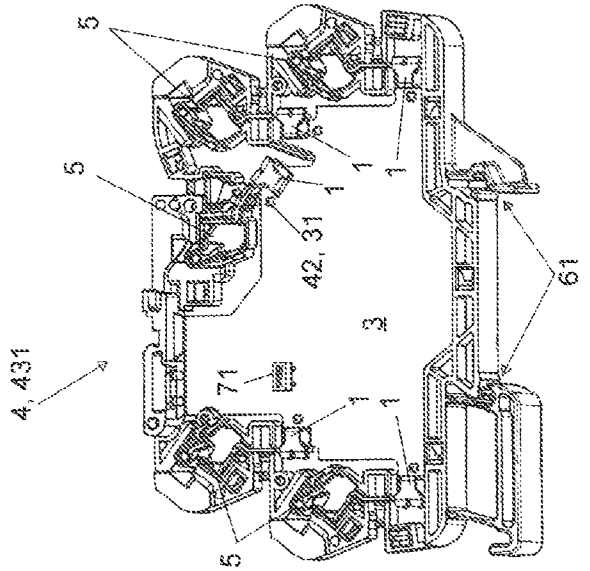
FIG. 3A is a perspective view of a first housing shell of a double-shell terminal block with a mounted circuit board.

FIG. 3 shows a two-shell terminal block 4. The terminal block 4 has a first housing shell 431, shown in FIG. 3A, and a second housing shell 432, shown in FIG. 3B. The housing shells are formed to correspond to each other so that they can be mounted flush against each other. The housing shells 431, 432 mounted flush against each other, i.e. the fully assembled terminal block, are shown in FIG. 3(*d*). In the exploded view of the terminal block 4 shown in FIG. 3(*c*), it is visible that an insulating wall 433 is arranged between the two housing shells 431, 432.

It is visible that in each of the two housing shells 431, 432 several connection devices 5 are provided for connecting an electrical conductor. The connection devices 5 each have a busbar 2. Furthermore, each of the two housing shells 431, 432 has a recess 40 in which a circuit board 3 with the connecting elements 1 attached to it is mounted. Each of the connection devices 5, or each busbar 2, is assigned a connecting element 1. The circuit boards 3 are each mounted by sliding the connecting elements 1 onto the busbars 2 assigned to them. Here again, pins 42 associated with the connecting elements 1 are provided as stops, which are guided through through-holes 31 in the circuit board 3.

The circuit board 3 inserted in the first housing shell 431 is equipped with an electrical connection device 71, wherein the circuit board 3 inserted into the second housing shell 432 is equipped with a correspondingly designed counter-connecting device 72. The connecting device 71 and counter-connecting device 72 are provided for electrically connecting conductor tracks and/or conductive surfaces of the two circuit boards 3. They are placed in such a way that they make electrically conductive contact when the housing shells 431, 432 are joined together. To enable this, a breakout area (not shown) is provided in the insulating wall 433, which is broken out before the terminal block 4 is mounted.

Figure 4A:
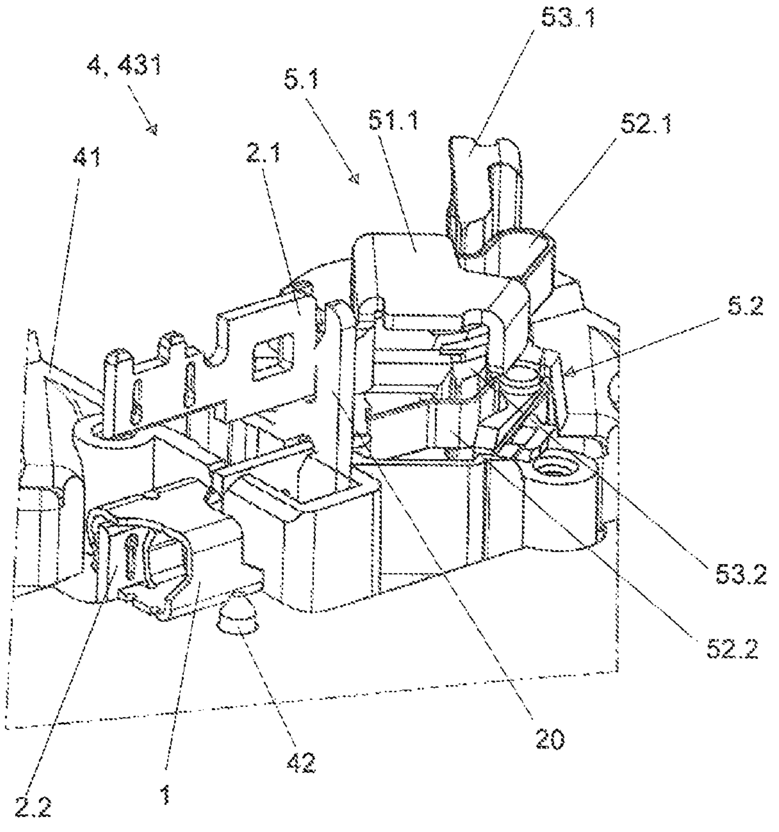
FIG. 4A is a perspective view of a section of a double-shell terminal block.

FIG. 4A shows a section of the terminal block 4 of FIG. 3. The insulating wall 433 is not shown here.

Visible are connection devices 5.1, 5.2 arranged opposite each other, which are designed as spring-loaded terminals. They each have a clamping cage 51.1 in which a clamping spring 52.1, 52.2 is arranged, by means of which an electrical conductor inserted into the connecting device 5.1, 5.2 can be clamped to a busbar 2.1, 2.2 associated with the connecting device 5.1, 5.2 so as to make electrical contact with the latter. To release the electrical conductor from the connection device 5.1, 5.2, an actuating device 53.1, 53.2 is provided in each case, which actuates the clamping spring 52.1, 52.2 by displacement, so that the latter is displaced against its restoring force and clamping of the electrical conductor between the busbar 2.1, 2.2 and the clamping spring 52.1, 52.2 is released. Visible here is a connecting rail 20 which electrically conductively connects the two busbars 2.1, 2.2 of the adjacent connecting devices 5.1, 5.2.

Figure 4B:
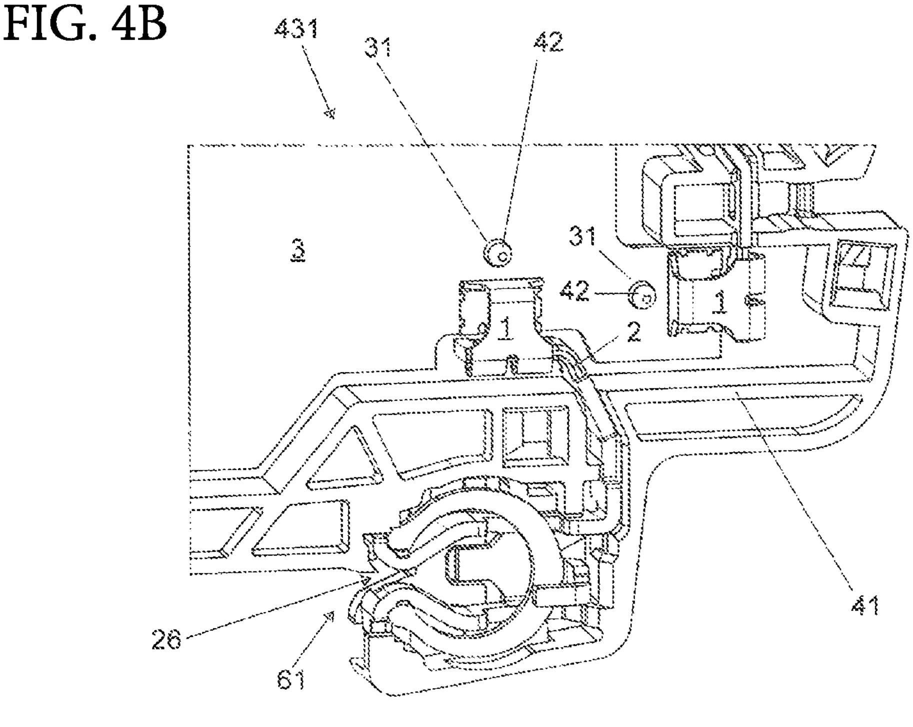
FIG. 4B is a perspective view of a section of a housing shell of a further embodiment of a terminal block.

FIG. 4B shows a housing shell 431 of a terminal block 4, which has projections 61 for snapping the terminal block 4 onto a rail (not shown). In this embodiment of the terminal block 4, one of the busbars 2 on which the circuit board 3 is mounted by a connecting element 1 is assigned to a functional earth contact 26 which is provided for grounding the rail.

The invention claimed is:

1. A connecting element, comprising (a) a flat mounting portion configured for mounting on a circuit board; and (b) a tulip contact extending at a mounting angle greater than 45° and less than 135° relative to said mounting portion and configured to receive a flat conductor in an electrically contacting manner, said tulip contact including at least one clamping element which extends in a sliding direction relative to the flat conductor and a support element which extends in a direction against the sliding direction between which a receptacle for the flat conductor is defined, a free end of said clamping element extending from said mounting portion at the mounting angle.

2. A connecting element as defined in claim 1, wherein said support element includes a free end which extends from said mounting portion at the mounting angle.

3. An electrical circuit board including the at least one connecting element as defined in claim 1.

4. An electrical circuit board as defined in claim 3, wherein said mounting portion of each connecting element lies flat against the circuit board.

5. A connecting element, comprising (a) a flat mounting portion configured for mounting on a circuit board;

(b) a tulip contact configured to receive a flat conductor in an electrically contacting manner and including at least one clamping element which extends in a sliding direction relative to the flat conductor and a support element which extends in a direction against the sliding direction between which a receptacle for the flat conductor is defined; and (c) a connecting arm extending from said mounting portion opposite said support element, said connecting arm extending above and spaced from a free end of said support element, said at least one clamping element extending from said connecting arm.

6. A connecting element as defined in claim 5, wherein said at least one clamping element extends resiliently from said connecting arm.

7. A connecting element as defined in claim 5, wherein at least two clamping elements are arranged side by side on said connecting arm.

8. A connecting element as defined in claim 5, wherein said connecting arm has a rectangular cross-sectional shape.

9. A connecting element as defined in claim 5, wherein an outer surface of said connecting arm is configured for fastening to an automation robot.

10. A connecting element as defined in claim 5, wherein said mounting portion, said connecting arm and said at least one clamping element are manufactured from an electrically conductive flat strip material as a stamped and bent component.

11. A connecting element, comprising (a) a flat mounting portion which contains a through-hole for mounting on a circuit board; and (b) a tulip contact configured to receive a flat conductor in an electrically contacting manner and including at least one clamping element which extends in a sliding direction relative to the flat conductor and a support element which extends in a direction against the sliding direction between which a receptacle for the flat conductor is defined.

* * * * *